(12) United States Patent
Song et al.

(10) Patent No.: US 11,901,975 B2
(45) Date of Patent: Feb. 13, 2024

(54) CHANNEL STATE INFORMATION FEEDBACK METHOD IN RECONFIGURABLE INTELLIGENT SURFACE-BASED MASSIVE MIMO SYSTEM

(71) Applicant: INDUSTRY ACADEMY COOPERATION FOUNDATION OF SEJONG UNIVERSITY, Seoul (KR)

(72) Inventors: Hyoung Kyu Song, Seongnam-si (KR); Young Hwan You, Seoul (KR); Beom Sik Shin, Seoul (KR); Ji Hye Oh, Seoul (KR); Min A Kim, Seoul (KR); Thanh Binh Nguyen, Seoul (KR); Abrar Shakil Sejan Mohammad, Seoul (KR)

(73) Assignee: INDUSTRY ACADEMY COOPERATION FOUNDATION OF SEJONG UNIVERSITY

( * ) Notice: Subject to any disclaimer, the term of this patent is extended or adjusted under 35 U.S.C. 154(b) by 0 days.

(21) Appl. No.: 17/889,348

(22) Filed: Aug. 16, 2022

(65) Prior Publication Data
US 2023/0421211 A1    Dec. 28, 2023

(30) Foreign Application Priority Data
Jun. 28, 2022    (KR) ........................ 10-2022-0078948

(51) Int. Cl.
*H04L 1/02*    (2006.01)
*H04B 7/0417*    (2017.01)
(Continued)

(52) U.S. Cl.
CPC ......... *H04B 7/0417* (2013.01); *H04B 7/0452* (2013.01); *H04B 7/0456* (2013.01)

(58) Field of Classification Search
CPC .. H04B 7/0617; H04B 17/204; H04B 7/0632; H04W 72/23; H04W 72/541; H04W 36/0094
(Continued)

(56) References Cited

U.S. PATENT DOCUMENTS

2010/0202548 A1* 8/2010 Sanayei ............... H04B 7/0417
                                                        375/260
2014/0093005 A1* 4/2014 Xia ........................ H04L 1/007
                                                        375/267
(Continued)

FOREIGN PATENT DOCUMENTS

KR         20120044530 A         5/2012

*Primary Examiner* — Khai Tran
(74) *Attorney, Agent, or Firm* — Renaissance IP Law Group LLP

(57) ABSTRACT

The present disclosure relates to a method for feeding back reliable downlink channel state information from a receiver to a transmitter in a multi-user massive MIMO system based on a reconfigurable intelligent surface, and more particularly, to a method for the receiver to transform acquired downlink channel state information into downlink channel state information in an angle domain and compress the downlink channel state information through a compressed-sensing scheme, and then feed the compressed result back to the transmitter, and for the transmitter to acquire the reliable downlink channel state information through a recovery algorithm.

According to the present disclosure, the downlink channel state information is compressed according to a compression and recovery algorithm in an mmWave environment, and only a codeword index suitable for the compressed result is fed back to the transmitter to obtain the effect of reduction in feedback overhead in the entire communication system.

10 Claims, 7 Drawing Sheets

(51) Int. Cl.
*H04B 7/0456* (2017.01)
*H04B 7/0452* (2017.01)

(58) Field of Classification Search
USPC .......................................... 375/267, 260, 262
See application file for complete search history.

(56) References Cited

U.S. PATENT DOCUMENTS

| | | | |
|---|---|---|---|
| 2023/0125714 A1* | 4/2023 | Lee ..................... | H04W 72/541 |
| | | | 370/277 |
| 2023/0208479 A1* | 6/2023 | Wang ................... | H04B 7/0617 |
| | | | 375/262 |
| 2023/0208486 A1* | 6/2023 | Dai ..................... | H04B 7/04013 |
| | | | 370/315 |

* cited by examiner

CHANNEL STATE INFORMATION FEEDBACK METHOD IN RECONFIGURABLE INTELLIGENT SURFACE-BASED MASSIVE MIMO SYSTEM

CROSS-REFERENCE TO RELATED APPLICATION

This application claims priority to Korean Patent Application No. 10-2022-0078948 filed on Jun. 28, 2022 and all the benefits accruing therefrom under 35 U.S.C. § 119, the contents of which are incorporated by reference in their entirety.

BACKGROUND

The present inventive concept relates to a channel state information feedback method for beamforming in a multi-user (MU) multi-input multi-output (MIMO) system including a reconfigurable intelligent surface (RIS), and more particularly, to a method for a transmitter to efficiently compress massive downlink channel state information and feed the compressed result back to a transmitter.

An RIS is one of the most notable technologies that will be utilized in a future B5G/6G wireless communication system. The RIS is a surface configured from several passive reflective elements, each of which may be controlled and thus the phase of an electromagnetic wave, which collides with the elements, may be independently adjusted. In order to improve data transmission rates of systems and extend data transmission coverage using the RIS, wireless communication channels may be adjusted in real time. However, in order to compensate for the performance limitation due to signal attenuation and reduction in propagation distance in a communication system in an mmWave band, a beamforming technology is essential. Accordingly, a feedback scheme is required for a transmitter to be able to obtain accurate channel state information. The forgoing issue may be addressed by adopting a scheme in which a transmitter and a receiver share in advance a codebook for the channel state information and then the receiver transmits an index of a codebook vector, which is the most suitable for the current channel state information, to the transmitter.

For an RIS-based communication system composed of a transmitter, a receiver, and RIS-based passive reflective elements, massive continuous downlink channel state information should be fed back from the receiver to the transmitter.

PATENT LITERATURE

Republic of Korea Patent Application Publication No. 10-2012-0044530 (Publication date: May 8, 2012)

SUMMARY

The present disclosure provides a method and algorithm for a receiver to quantize and compress downlink channel state information for beamforming, and then feed the compressed channel state information back to a transmitter in an RIS-based massive MIMO system.

The present disclosure is to develop a method for compressing massive downlink channel state information to feed back the compressed result from a receiver to a transmitter. In accordance with an example embodiment, the method includes: compressing, by the receiver, channel state information using a compressed-sensing scheme to feed the compressed result back to the transmitter; and acquiring, by the transmitter, downlink channel state information through recovery of the channel state information using an Orthogonal Matching Pursuit (OMP) algorithm.

The compressing, by the receiver, channel state information may include transforming, by the receiver, an acquired downlink channel state information matrix into a channel state information matrix in an angle domain. For the transformed channel state information matrix in the angle domain, a channel component value may be concentrated in a column vector corresponding to a specific angle due to the characteristics of an mmWave channel, and thus the compression of the channel state information is enabled. However, due to the characteristics of the massive MIMO system, a plurality of antennas may become required, which make an issue of an increase in calculation complexity for quantization of a channel state information vector. The issue may be addressed by compressing the channel state information vector using the compressed-sensing scheme. The compressed-sensing scheme may be a scheme for compressing a sparse signal of which most values are 0s when a certain signal is transformed into a specific space, and be effective in compression of massive data. The compressed channel state information vector may be quantized using a codebook shared in advance between the transmitter and receiver, and an index of a corresponding codeword vector may be transmitted to the transmitter.

The acquiring, by the transmitter, downlink channel state information may include extracting a codeword corresponding to the received index from the codebook. The extracted codeword vector may be recovered using the OMP algorithm. The recovered codeword vector may be input to the specific angle measured in the receiver, and an estimated downlink channel state information matrix in the angle domain may be obtained through the corresponding process. From the acquired estimated downlink channel state information matrix in the angle domain, the estimated downlink channel state information matrix may be obtained through an inverse transform of the transform into the angle domain, the transform being performed in the receiver.

BRIEF DESCRIPTION OF THE DRAWINGS

Exemplary embodiments can be understood in more detail from the following description taken in conjunction with the accompanying drawings, in which.

DETAILED DESCRIPTION OF EMBODIMENTS

Hereinafter, embodiments of the present inventive concept will be described in detail with reference to the accompanying drawings so that the present disclosure may be easily implemented by those skilled in the art.

Figure 1:
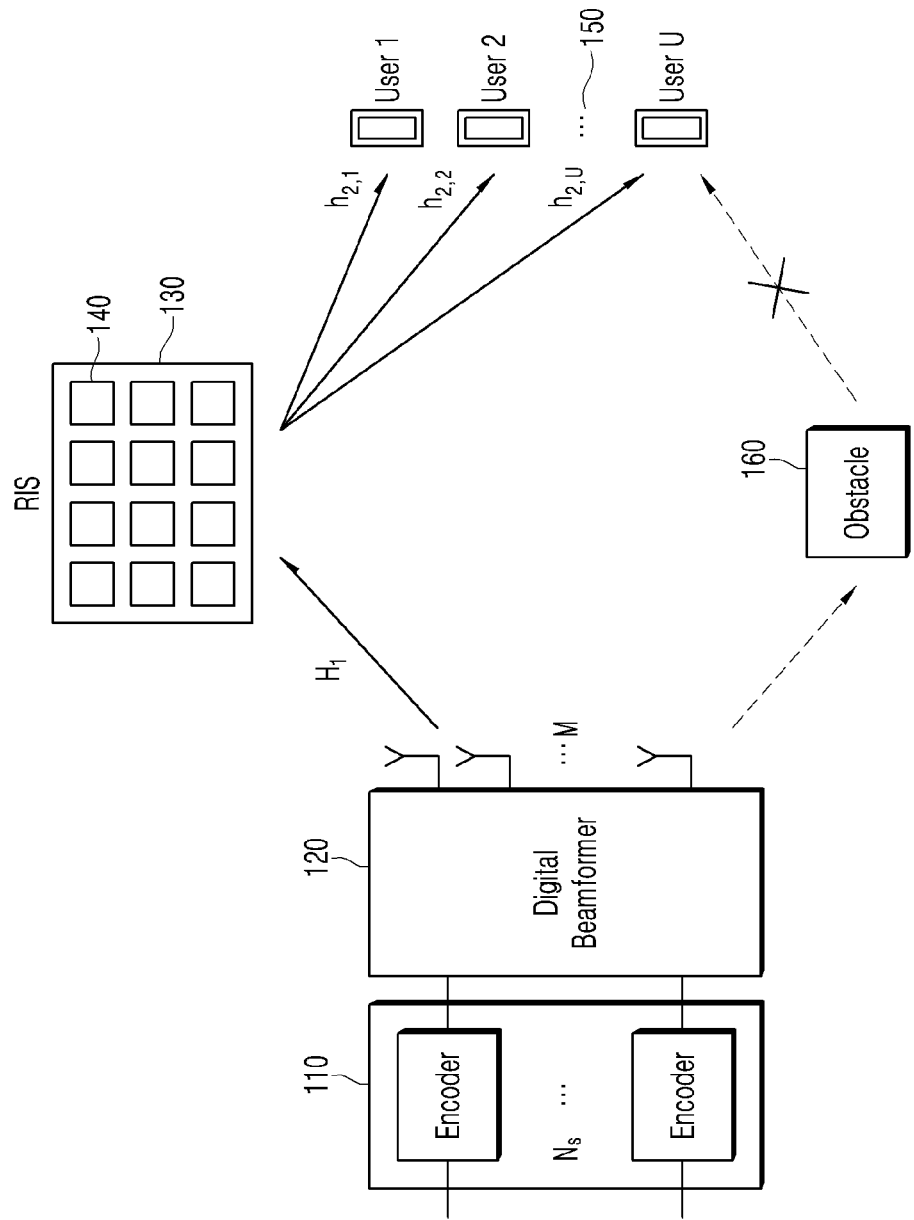
FIG. 1 shows a transmission and reception model of a MU-MIMO system including a downlink RIS.
Figure 2:
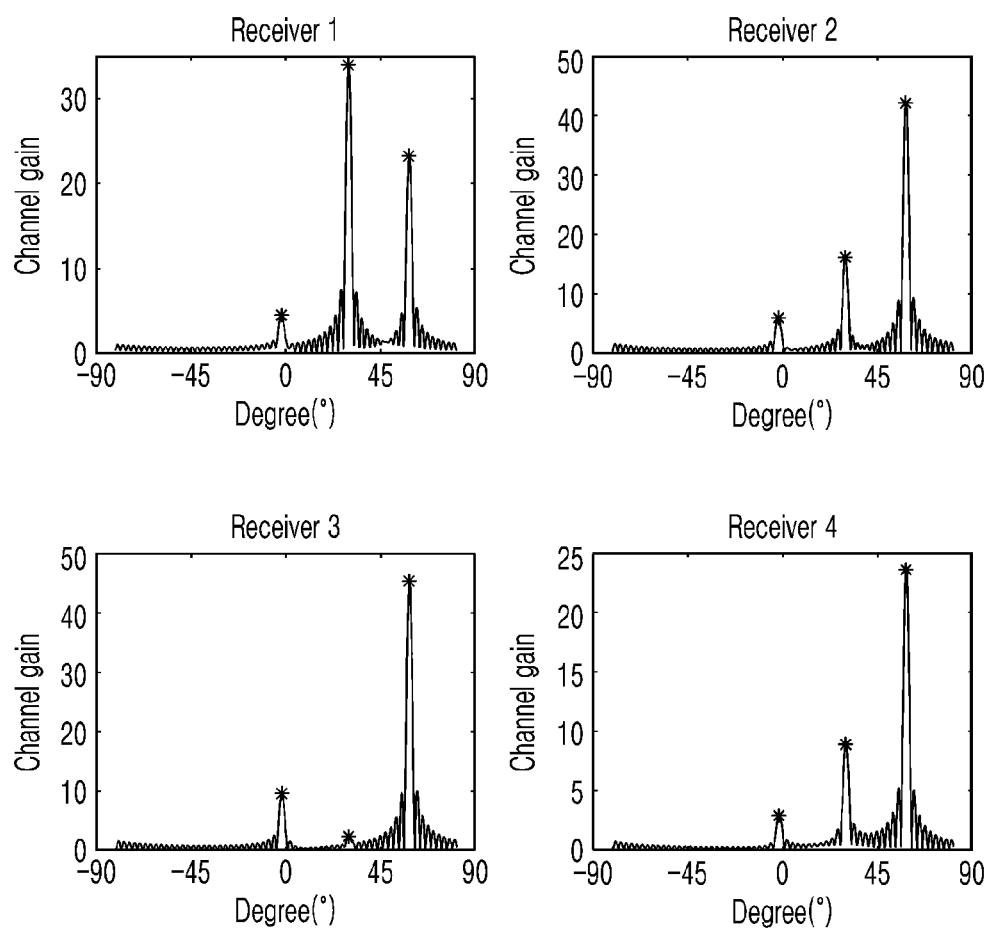
FIG. 2 indicates sparse channel characteristics in an mmWave channel to be utilized in an exemplary embodiment.

In the present disclosure, a downlink multi-user (MU) MIMO system is considered, the system including a transmitter 110 having M antennas, U receivers 150 each having a single antenna, and an RIS 130 having N reflective elements 140. FIG. 1 shows a transmission and reception model of an RIS-based MU MIMO system. The transmitter 110 transmits a transmission signal through a digital beamformer 120, and the transmission signal reaches the receivers 150 via the RIS.

The present disclosure calculates state information about a downlink channel on the basis of a reception signal received by the receiver, compresses the state information to acquire a measurement vector, and searches a codebook of the receiver for a codeword corresponding thereto. Thereafter, the searched codeword is fed back to the transmitter, and the transmitter estimates the measurement vector from a codebook of the transmitter using the fed-back codeword and acquires state information about the downlink channel.

1. Downlink Channel State Information Acquisition

Figure 3:
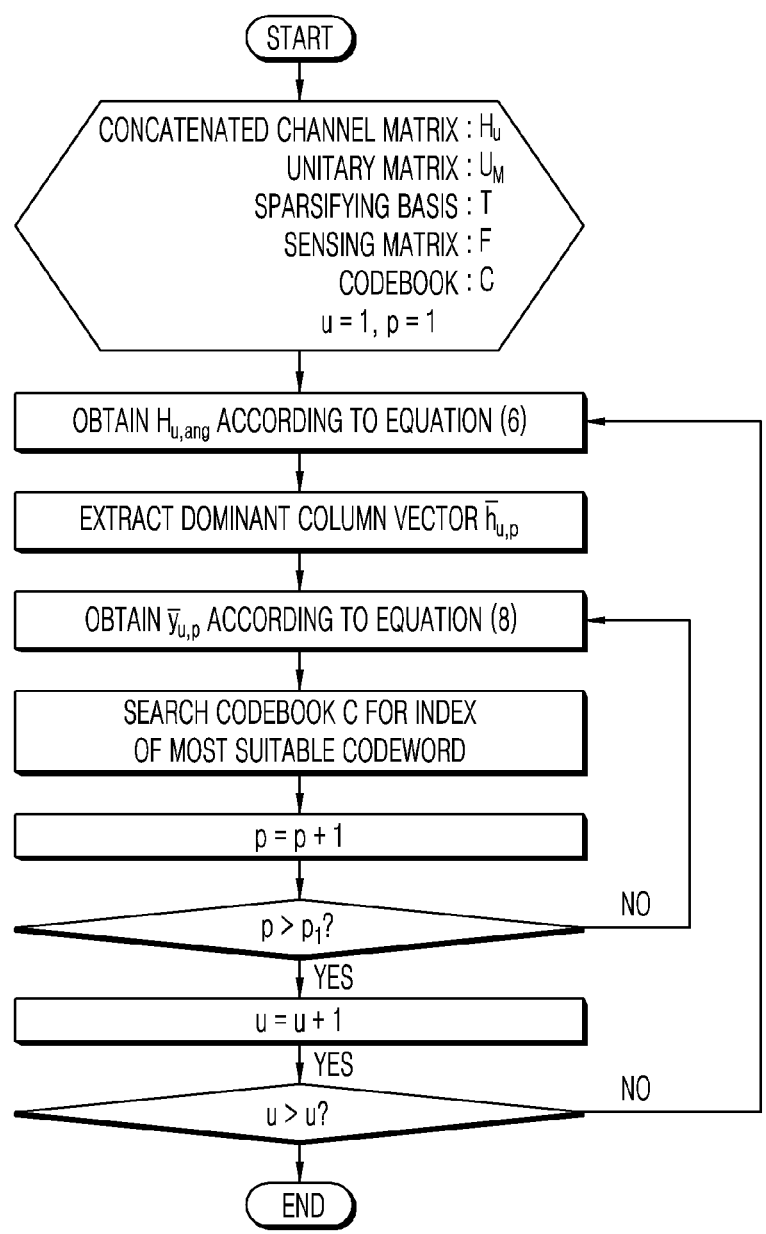
FIG. 3 is a flowchart of an algorithm for compressing downlink channel state information acquired by a receiver.
Figure 4:
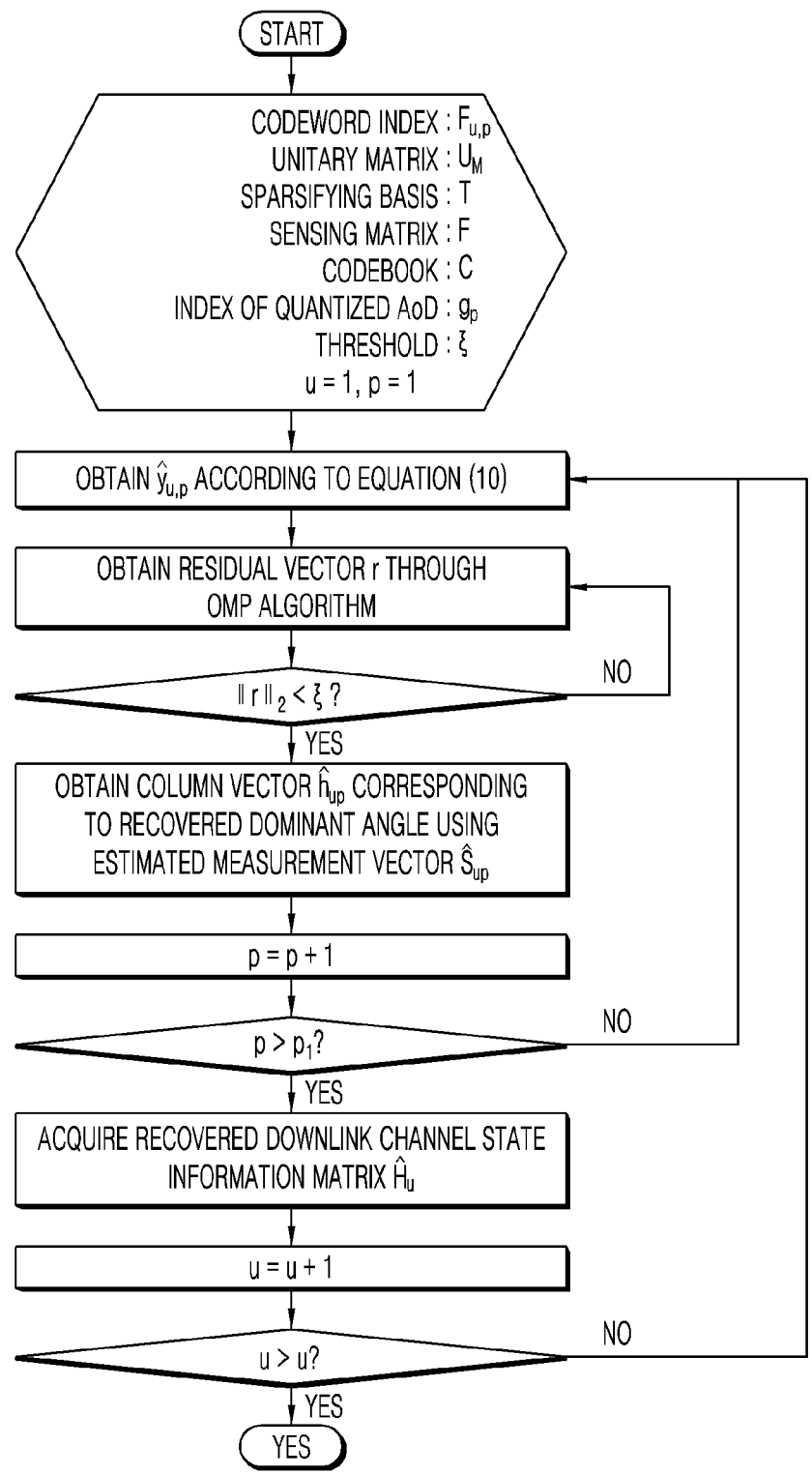
FIG. 4 is a flowchart of an algorithm for recovering an original channel state information matrix by utilizing downlink channel state information feedback information acquired by a transmitter from the receiver in an exemplary embodiment.

With reference to FIG. 3, a method for acquiring the downlink channel state information will be explained.

The receivers 150 acquire a concatenated channel matrix $H_u$ having the downlink channel state information from the reception signals according to a procedure to be described below.

1.1. Reception Signal Acquisition

In the present disclosure, a model of a signal received by a u-th receiver 150 may be expressed as Equation (1).

$$y_u = h_{2,u}^H \Phi H_1 x + n_u \quad (1)$$

where $y_u$ denotes a signal received by the -th receiver, X denotes a precoded transmission signal, $H_1$ denotes a channel between the transmitter and the RIS, $h_{2,u}^H$ denotes a channel between the RIS and the u-th receiver, $n_u$ denotes an additive white Gaussian noise (AWGN), and $\Phi$ denotes a phase adjustment matrix of the reflective element. A phase and amplitude adjustment matrix may be expressed as $\Phi = \text{diag}(v)$ and written as $v = [\beta_1 e^{j\phi_1}, \beta_2 e^{j\phi_2}, \ldots, \beta_N e^{j\phi_N}]^T$ using a diag function for generating a diagonal matrix. Here, $\beta_n$ denotes a reflection amplitude value, $\phi_n$ denotes a phase adjustment value, v expresses the phase adjustment value and the amplitude value as a vector for each element and is set as $\beta_n = 1$, and the phase value is set as $\phi_n \in [0, 2\pi]$ assuming that reflective attenuation is not considered in the present disclosure.

1.2. Downlink Channel State Information Acquisition

In Equation (1) that indicates the reception signal, $h_{2,u}^H \Phi H_1$ denotes the total channels between the transmitter and the u-th receiver. The downlink channel $h_{2,u}^H \Phi H_1$ satisfies the following Equation (2).

$$h_{2,u}^H \Phi_1 = h_{2,u}^H \text{diag}(v) H_1 = v^T \text{diag}(h_{2,u}^H) H_1 \quad (2)$$

Equation (2) indicates the total channels between the transmitter and the u-th receiver. $\Phi$ Is a diagonal matrix and the entire matrix $h_{2,u}^H \Phi H_1$ may be replaced with $v^T \text{diag}(h_{2,u}^H) H_1$ using the property of the diagonal matrix. Here, $v^T$ is obtained by converting the amplitude and phase adjustment vector v, which is a column vector, into a row vector.

In Equation (2), except for $v^T$, a downlink channel state information matrix $\text{diag}(h_{2,u}^H) H_1$ may be obtained which is configured from only channel components other than the amplitude and phase adjustment value v of the RIS reflective element as shown in the following Equation (3).

$$H_u = \text{diag}(h_{2,u}^H) H_1 \quad (3)$$

where $H_u$ denotes a concatenated channel matrix in the u-th receiver, and is the downlink channel state information matrix that represents the states of the downlink channels. Through the corresponding concatenated channel matrix, the channel state information matrix may be obtained which includes only the channel components other than a phase adjustment value of the reflective element.

Furthermore, the following Equation (4) indicates a vector for calculating a component of a channel according to an angle during modeling the channels. For a sparse channel environment in an mmWave band, a component value is obtained only in a very limited angle domain, and thus during transform into the angle domain, a channel component is generated only at a specific angle to facilitate compression of the channel state information.

$$a(\phi, \theta) = \frac{1}{\sqrt{N}} \left[ 1, \ldots, e^{j\frac{2\pi}{\lambda} d_r(n_1 \cos(\theta)\sin(\phi) + n_2 \sin(\theta))}, \ldots, e^{j\frac{2\pi}{\lambda} d_r((N_1-1)\cos(\theta)\sin(\phi) + (N_2-1)\sin(\theta))} \right]^T \quad (4)$$

$$a(\phi) = \frac{1}{\sqrt{M}} \left[ 1, \ldots, e^{j\frac{2\pi}{\lambda} d_a(m \sin(\phi))}, \ldots, e^{j\frac{2\pi}{\lambda} d_a((M-1)\sin(\phi))} \right]^T$$

where $\phi, \theta$ denote an Azimuth-angle of Departure (AOD) and an Elevation-angle of arrival (EOA) of channels respectively, and $a(\phi, \theta)$ denotes a response vector when the AOD and EOA are $\phi, \theta$ respectively.

A channel signal $H_1$ between the transmitter and the RIS may be described using the vector of Equation (4) as the following Equation (5).

$$H_1 = \sqrt{\frac{MN}{P_1}} \sum_{p=1}^{P_1} g_p^1 a_r(\phi_{r,p}^1, \theta_{r,p}^1) a_t^H(\phi_{t,p}^1) \quad (5)$$

$$h_{2,u}^H = \sqrt{\frac{M}{P_2}} \sum_{p=1}^{P_2} g_p^2 a_t^H(\phi_{t,p,u}^2, \theta_{t,p,u}^2)$$

where M and N denote the number of antennas of transmitter and the number of RIS elements respectively, and $P_1$ and $P_2$ denote the number of propagation paths between the transmitter and the RIS, and the number of propagation paths between the RIS and the receivers. $g_p^1, g_p^2$ denote channel gain values between the transmitter and the RIS, and channel gain values between the RIS and the receivers, $\phi_{t,p}^1$ denotes an AoD between the transmitter and the RIS, $\theta_{r,p}^1$ denotes an EoA, $\phi_{t,p,u}^2, \theta_{t,p,u}^2$ and denote an AoD and an EoA between the RIS and the receivers respectively. $A_r, a_r$ mean response vectors of Equation (4) in the transmitter and the receives respectively.

2. Codeword Index Derivation Step

With reference to FIG. 3, a procedure for deriving a codeword index in the receiver will be described.

2.1. Transform a Channel State Information Matrix into a Channel State Information Matrix in the Angle Domain As the following Equation (6), the previously acquired downlink channel state information matrix is multiplied by a unitary matrix $U_M$ and transformed into a channel state information matrix in the angle domain.

$$H_{u,ang} = H_u U_M \quad (6)$$

where $H_{u,ang}$ denotes the transformed channel matrix in the angle domain in the u-th receiver, and $U_M$ denotes the unitary matrix for transforming the channel into the channel in the angle domain.

$U_M$ is composed of a response vector of the channel and may be expressed as Equation (7). The channel is expressed in the angle domain, thereby acquiring a sparse channel matrix, which is the channel characteristics in the mmWave band, from the transformed channel matrix in the angle domain.

$$U_M = [a_t(\phi_1), \ldots, a_t(\phi_g), \ldots, a_t(\phi_G)] \quad (7)$$
$$\phi_g = -\frac{\pi}{2} + \frac{\pi}{G}(g-1)$$

where $\phi_g$ denotes a quantized AOD quantized into prescribed g periods, and in the present disclosure, an angle in a range of $$-\frac{\pi}{2} \sim \frac{\pi}{2}$$

is quantized into the g periods. In an embodiment of the present disclosure, the range $$-\frac{\pi}{2} \sim \frac{\pi}{2}$$

is quantized into $2^{10}$ periods.

2.2. Acquisition of Sparse Channel Vector and Compression of Channel State Information Using the Same As described above, the transformed matrix in the angle domain includes a column vector having a high channel gain and corresponding to an angle at which a signal is received, and column vectors having very small channel gains converged to 0 and corresponding to the other angles. Through this, the massive downlink channel state information of N×M may be compressed to a matrix of N×P$_1$. P$_1$ means the number of dominant propagation paths due to the mmWave channel characteristics.

The sparse channel vector $S_{u,p}$ is acquired from ① of the following Equation (8), and using this, a measurement vector $\bar{y}_{u,p}$ is acquired by compressing the channel state information according to ② of Equation (8).

$$①s_{u,p}=T^H\bar{h}_{u,p},$$

$$②=AT s_{u,p}=F s_{u,p} \quad (8)$$

In Equation (8), u denotes a u-th user among total U users, p denotes a p-th path among total dominant paths P$_1$, $\bar{h}_{u,p}$ is a column vector of $H_{u,ang}$, T denotes a sparsifying basis matrix, A denotes a linear measurement matrix, and F denotes a sensing matrix.

In other words, the first term ① of Equation (8) may refer to a term for a compressed sensing scheme using a column vector $\bar{h}_{u,p}$ of an angle corresponding to a dominant path, and indicates a sparse vector $s_{u,p}$ (meaning a sparse vector corresponding to a p-th path of a u-th user) of which most values are 0 and which is obtained by acquiring the dominant column vector $\bar{h}_{u,p}$ from $H_{u,ang}$, and multiplying $\bar{h}_{u,p}$ by the sparsifying basis matrix T that utilizes a discrete Fourier transform (DFT) matrix according to Equation (8).

Furthermore, in the second term ② of equation 8, the sensing matrix F may be obtained by multiplication of the linear measurement matrix A and the sparsifying basis matrix T, and then a finally compressed measurement vector $\bar{y}_{u,p}$ may be obtained using the sparse vector $s_{u,p}$. The magnitude of the measurement vector may be adjusted according to a compression rate to reduce the magnitude of a column vector corresponding to the existing dominant angle. Thus it is effective to reduce the calculation complexity and the amount of calculations in a process of searching the codebook (C) of Equation (9).

2.3. Codeword Index Acquisition

Furthermore, according to the following Equation (9), a codeword index $F_{u,p}$ is acquired from the acquired compressed channel state information vector (measurement vector) $\bar{y}_{u,p}$. The transmitter receives this codeword index from the receiver and estimates the channel state information vector (measurement vector).

$$F_{u,p} = \arg\max_{j=1,\ldots,2^B} |\tilde{y}_{u,p}^H w_j| \quad (9)$$

where $\tilde{y}_{u,p}$ denotes a directional component of the measurement vector $\bar{y}_{u,p}$, $w_j$ denotes j-th codeword vector of the codebook C=[$w_1, \ldots, w_{2^B}$], and $F_{u,p}$ denotes a codeword index satisfying Equation (9). Through this term, the most suitable codeword for the downlink channel state information may be searched, and the reduction in calculation complexity required for searching the codeword may be achieved using data compression through the compressed-sensing scheme. The acquired codeword index is fed back to the transmitter.

The foregoing processes are repeated for all the paths and user receivers (p<=P, u<=U).

3. Measurement Vector Estimation

The transmitter receives the acquired codeword index $F_{u,p}$ from the receiver, and estimates the measurement vector from the codeword index. The estimated measurement vector $\hat{y}_{u,p}$ for the measurement vector $\bar{y}_{u,p}$ in the transmitter may be calculated from the following Equation (10).

$$\hat{y}_{u,p}=|\bar{y}_{u,p}|w_{F_{u,p}} \quad (10)$$

where W denotes codewords forming the codebook shared between the transmitter and the receiver, and $W_{F_{u,p}}$ denotes a codeword of which the index is $F_{u,p}$.

Next, the acquired estimated measurement vector $\hat{y}_{u,p}$ and the known Orthogonal Matching Pursuit (OMP) algorithm are used for estimating the sparse vector $\hat{s}_{u,p}$.

Next, the estimated sparse vector $\hat{s}_{u,p}$ and the sparsifying basis matrix T are used for acquiring the column vector $\hat{h}_{u,p}$ corresponding to the dominant angle estimated from the following Equation (11).

$$\hat{h}_{u,p}=T\hat{s}_{u,p} \quad (11)$$

where $\hat{h}_{u,p}$ denotes a column vector corresponding to the dominant angle recovered from the transmitter, $\hat{s}_{u,p}$ denotes the estimated sparse vector acquired using the OMP algorithm and the measurement vector $\hat{y}_{u,p}$ estimated from the transmitter.

4. Recovery of Downlink Channel State Information Matrix $$\hat{H}_u=\hat{H}_{u,ang}U_M^H \quad (12)$$

where $\hat{H}_{u,ang}$ is the downlink channel state information matrix in the angle domain recovered by allocating the column vector $\hat{h}_{u,p}$ corresponding to the dominant angle recovered by Equation (10) to a corresponding angle, and $\hat{H}_u$ denotes the downlink channel state information matrix recovered through the inverse transform of the transformed channel state information in the angle domain.

$$h_u = h_{2,u}^H \Phi H_1 = v^T \mathrm{diag}(h_{2,u}^H) H_1 = v^T \hat{H}_u \qquad (13)$$

where $h_u$ denotes the entire channel matrix across the transmitter-RIS-receiver from the u-th receiver indicated in Equation (2), and the matrix may be obtained using the downlink channel state information matrix $\hat{H}_u$ recovered through Equation (12).

The acquired matrix is used for performing the entire process of a signal in the digital beamformer 120, and the beamformer is used for transmitting data generated from the encoder 110.

EMBODIMENT

Figure 5:
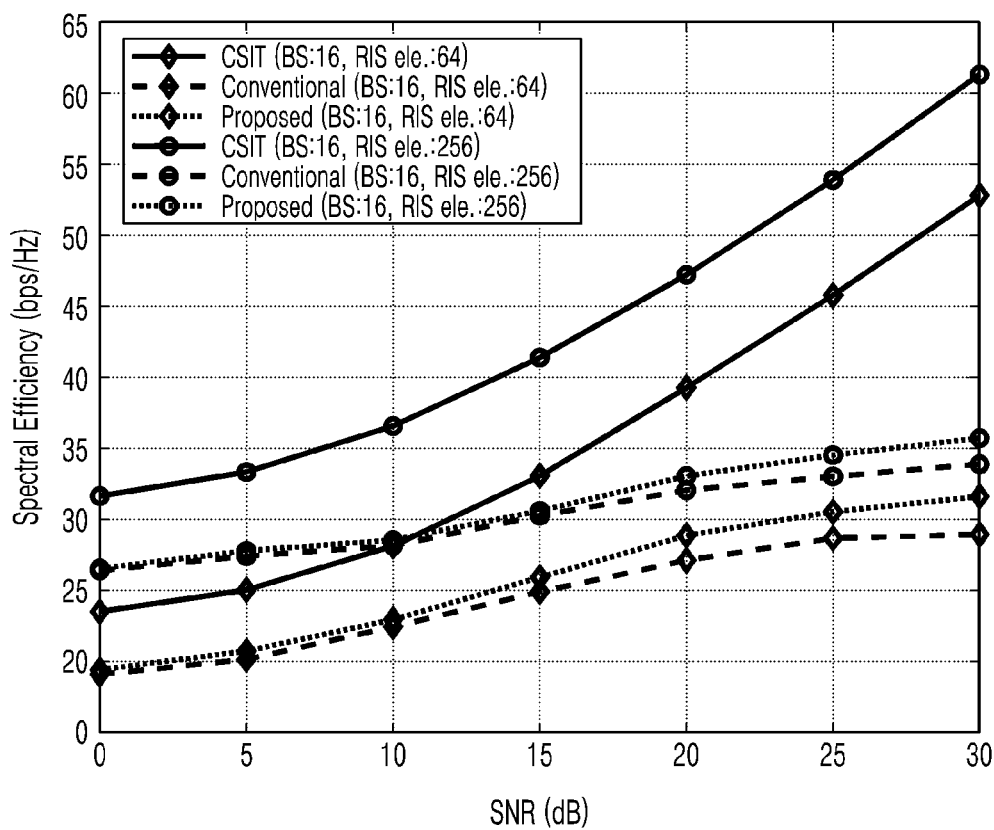
FIGS. 5 to 7 show graphs of frequency efficiency performance for each of cases where the transmitter acquires complete downlink channel state information, feeds back the downlink channel state information using the existing scheme, and feeds back the downlink channel state information using a scheme in the present disclosure in respective different environments.
Figure 6:
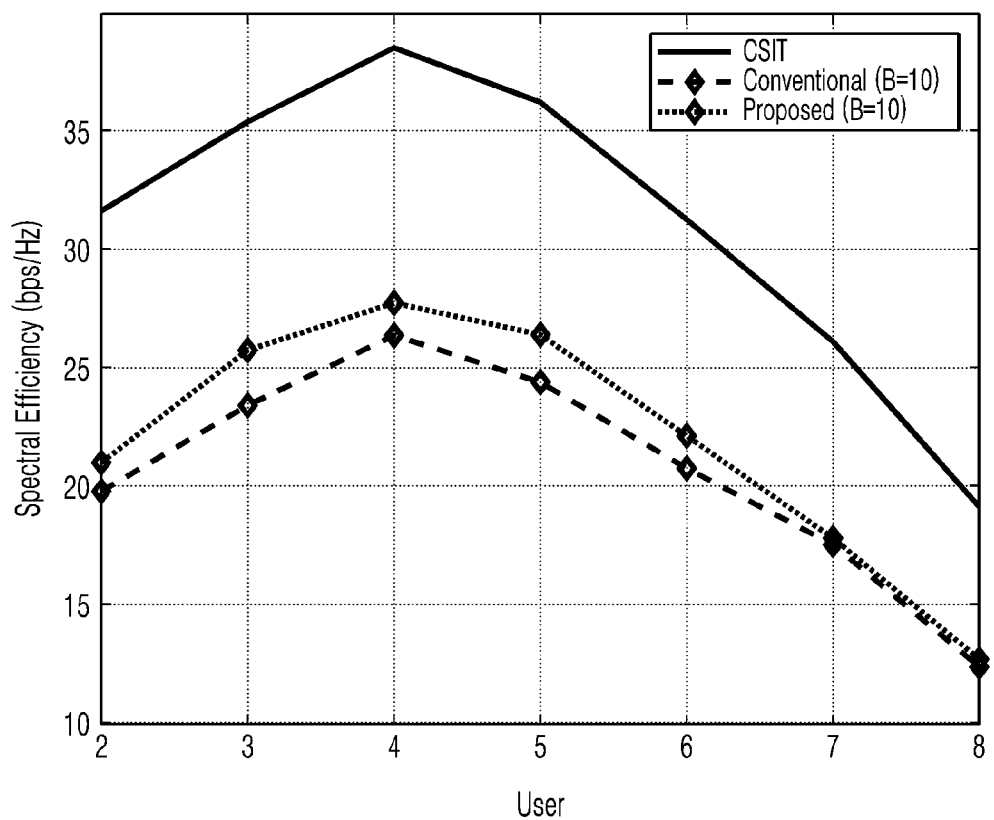
Figure 7:
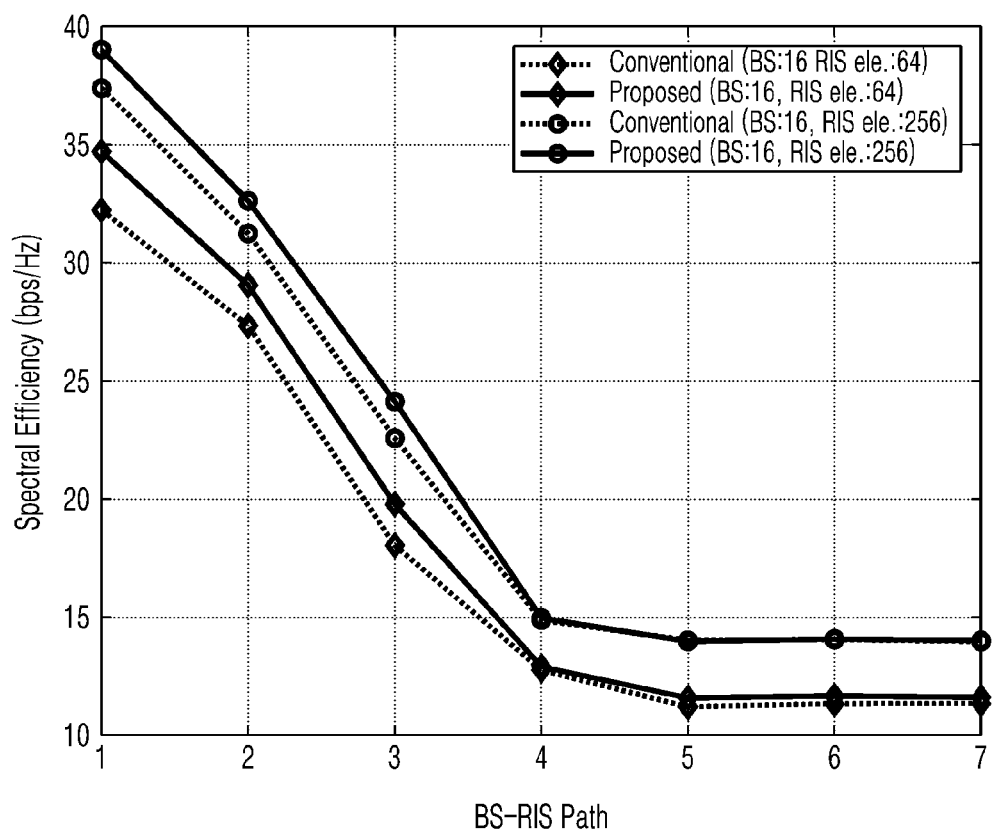

FIGS. 5, 6 and 7 are simulation results using the present disclosure. This is a frequency efficiency calculated in a receiver side.

FIG. 5 shows a comparison result of system frequency efficiencies among situations in which the transmitter is assumed to have perfect channel state information in an environment set as M=16, N=64,256, U=4, B=10, in which the transmitter acquires the channel state information through the existing scheme, and in which the transmitter acquires the channel state information through the present disclosure. It may be confirmed that the transmitter in the system adopting the present disclosure may acquire more reliable channel state information than the transmitter in the system adopting the existing scheme.

FIG. 6 shows a comparison result of system frequency efficiencies according to the number of receivers among situations in which the transmitter is assumed to have perfect channel state information in an environment set as M=16, N=64, B=10, in which the transmitter acquires the channel state information through the existing scheme, and in which the transmitter acquires the channel state information through the present disclosure. It may be confirmed that the performance of the system based on the present disclosure is improved than that of the system based on the existing scheme. However, all the three cases show a degradation of performance according to an increase in the receivers due to a channel rank deficiency on the system.

FIG. 7 shows a comparison result of system frequency efficiencies according to the number of dominant paths between the transmitter and the RIS in an environment set as M=16, N=64,256, U=4, B=10 between situations in which the transmitter acquires the channel state information through the existing scheme, and in which the transmitter acquires the channel state information through the present disclosure. It may be confirmed that the performance of the system based on the present disclosure is improved in comparison to the system based on the existing scheme. For both of the two schemes, as the number of dominant paths increases, an error increases when the channel state information is quantized, and thus the system performance is reduced and converged.

According to the present disclosure, a compressed sensing-based algorithm is provided for effectively compressing/transmitting and recovering channel state information in a multi-user MIMO system including an RIS, and through the algorithm, the transmitter may acquire estimated channel state information with higher reliability in comparison to the existing method.

The present disclosure has been described using preferred embodiments. However, it is to be understood that the scope of the present disclosure is not limited to the disclosed embodiments. In addition, it should be understood that all changes or modifications derived from the definitions and scopes of the Claims and their equivalents fall within the scope of the present inventive concept.

What is claimed is:

1. A downlink channel state information feedback method between a transmitter and a receiver, wherein downlink channel state information is acquired in the receiver and fed back to the transmitter in a reconfigurable intelligent surface (RIS)-based multi-user (MU)-multi-input multi-output (MIMO) system, the downlink channel state information feedback method comprising:
    a downlink channel state information acquisition step for acquiring the downlink channel state information via the RIS from a reception signal;
    an angle domain transform step for transforming the acquired downlink channel state information into a channel state information matrix in an angle domain;
    a codeword index derivation step for compressing the channel state information matrix transformed in the angle domain transform step, and deriving a codeword index corresponding to a corresponding vector from a compressed downlink channel state information vector;
    a channel state information vector estimation step for receiving a feedback of the derived codeword index to estimate a measurement vector, and estimating a sparse vector using the estimated measurement vector to estimate the compressed downlink channel state information vector; and
    a step for recovering a downlink channel state information matrix using the estimated compressed downlink channel state information vector.

2. The downlink channel state information feedback method of claim 1, wherein in the codeword index derivation step, the transforming the downlink channel state information via the RIS into the channel state information matrix in the angle domain is performed by matrix-multiplying the downlink channel state information matrix $H_u$ acquired by the receiver through a following Equation (1) by a unitary matrix $U_M$, $$H_{u,ang} = H_u U_M \qquad (1)$$

where u (u=1, ... U) denotes a number of users supportable in an RIS-based wireless communication system.

3. The downlink channel state information feedback method of claim 1, wherein the compressing the downlink channel state information using a compressed-sensing scheme is performed by transforming data through a following Equation (2), wherein a matrix T used for the transform is for finally acquiring a sparse vector $S_{u,p}$ using a discrete Fourier transform (DFT) matrix, $$s_{u,p} = T^H \bar{h}_{u,p} \qquad (2)$$

where u (u=1, ... ,U) denotes a number of users, and p (p=1, ... ,P) denotes a number of dominant paths between the transmitter and the RIS.

4. The downlink channel state information feedback method of claim 3, wherein the measurement vector $\bar{y}_{u,p}$ is obtained using the sparse vector $s_{u,p}$ acquired Equation (2) and a sensing matrix F obtained by multiplying a linear measurement matrix A by a sparsifying basis matrix T through a following Equation (3), $$\bar{y}_{u,p} = ATs_{u,p} = Fs_{u,p} \qquad (3)$$

where u (u=1, . . . ,U) denotes a number of users, and p (p=1, . . . ,P) denotes a number of dominant paths between the transmitter and the RIS.

5. The downlink channel state information feedback method of claim 4, wherein a codeword $F_{u,p}$ is derived through Equation (4) using the measurement vector $\bar{y}_{u,p}$ acquired through Equation (3) and by searching a most suitable codeword, $$F_{u,p} = \arg\max_{j=1,\ldots,2^B} |\bar{y}_{u,p}^H w_j| \quad (4)$$

where u (u=1, . . . ,U) denotes a number of users, p (p=1, . . . ,P) denotes a number of dominant paths between the transmitter and the RIS, and j denotes a size of a codebook.

6. The downlink channel state information feedback method of claim 1, wherein the receiving a feedback of the derived codeword index to estimate a measurement vector is acquiring the measurement vector estimated through a following Equation (5) using the codeword index derived through Equation (4) in the transmitter, $$\hat{y}_{u,p} = |\bar{y}_{u,p}| w_{F_{u,p}} \quad (5)$$

where u (u=1, . . . ,U) denotes a number of users, and p (p=1, . . . ,P) denotes a number of dominant paths between the transmitter and the RIS.

7. The downlink channel state information feedback method of claim 6, wherein the estimated sparse vector $\hat{s}_{u,p}$ is acquired through a estimated measurement vector $\hat{y}_{u,p}$ obtained through Equation (5) and an OMP (Orthogonal Matching Pursuit) algorithm for recovering the data compressed in the compressed-sensing scheme.

8. The downlink channel state information feedback method of claim 7, wherein a column vector $\hat{h}_{u,p}$ corresponding to a dominant angle is acquired, the dominant angle being estimated by a result of operation of the estimated sparse vector $\hat{s}_{u,p}$ acquired through a following Equation (6) and a sparsifying basis matrix T, $$\hat{h}_{u,p} = T\hat{s}_{u,p} \quad (6)$$

where u (u=1, . . . ,U) denotes a number of users, and p (p=1, . . . ,P) denotes a number of dominant paths between the transmitter and the RIS.

9. The downlink channel state information feedback method of claim 8, wherein the estimated downlink channel state information matrix $\hat{H}_{u,ang}$ in the angle domain is obtained using the column vector $\hat{H}_{u,p}$ corresponding to the estimated dominant angle acquired through Equation (6) and Azimuth-angle of Departure (AoD) information about an estimated signal.

10. The downlink channel state information feedback method of claim 9, wherein a finally estimated downlink channel state information $\hat{H}_u$ is obtained using an inverse transform of the transform into the angle domain for the estimated downlink channel state information matrix $\hat{H}_{u,ang}$ in the angle domain through a following Equation (7), $$\hat{H}_u = \hat{H}_{u,ang} U_M^H \quad (7)$$

* * * * *